(12) United States Patent
Kamba

(10) Patent No.: US 12,177,573 B2
(45) Date of Patent: Dec. 24, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Masaki Kamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 17/821,063

(22) Filed: Aug. 19, 2022

(65) Prior Publication Data

US 2023/0069440 A1 Mar. 2, 2023

(30) Foreign Application Priority Data

Aug. 24, 2021 (JP) ................. 2021-136104

(51) Int. Cl.
*H04N 23/695* (2023.01)
*H04N 23/62* (2023.01)
*H04N 23/73* (2023.01)

(52) U.S. Cl.
CPC ........... *H04N 23/695* (2023.01); *H04N 23/62* (2023.01); *H04N 23/73* (2023.01)

(58) Field of Classification Search
CPC ...... H04N 23/695; H04N 23/62; H04N 23/73; H04N 23/661
See application file for complete search history.

(56) References Cited

U.S. PATENT DOCUMENTS 9,922,387 B1 * 3/2018 Newman ............ H04N 1/32128
2015/0326968 A1 * 11/2015 Shigenaga ............ G09G 5/391
381/92

FOREIGN PATENT DOCUMENTS

JP 2012005020 A 1/2012

* cited by examiner

*Primary Examiner* — Christopher K Peterson
(74) *Attorney, Agent, or Firm* — Canon U.S.A., Inc. IP Division

(57) ABSTRACT

An information processing apparatus receives a user operation for issuing an instruction for reproducing a trace recording including information about (a) at least one of a pan value, a tilt value, a zoom value, and a value related to image quality conditions in a predetermined period for a first image capturing unit and (b) tally information indicating a state of video delivery in the predetermined period of the first image capturing unit, controls at least one of the pan value, the tilt value, the zoom value, and the value related to image quality conditions for the first image capturing unit according to the trace recording during a period in a case where the trace recording is being reproduced according to the received user operation, and displays information indicating the state of video delivery of the first image capturing unit according to the tally information recorded in the trace recording.

11 Claims, 12 Drawing Sheets

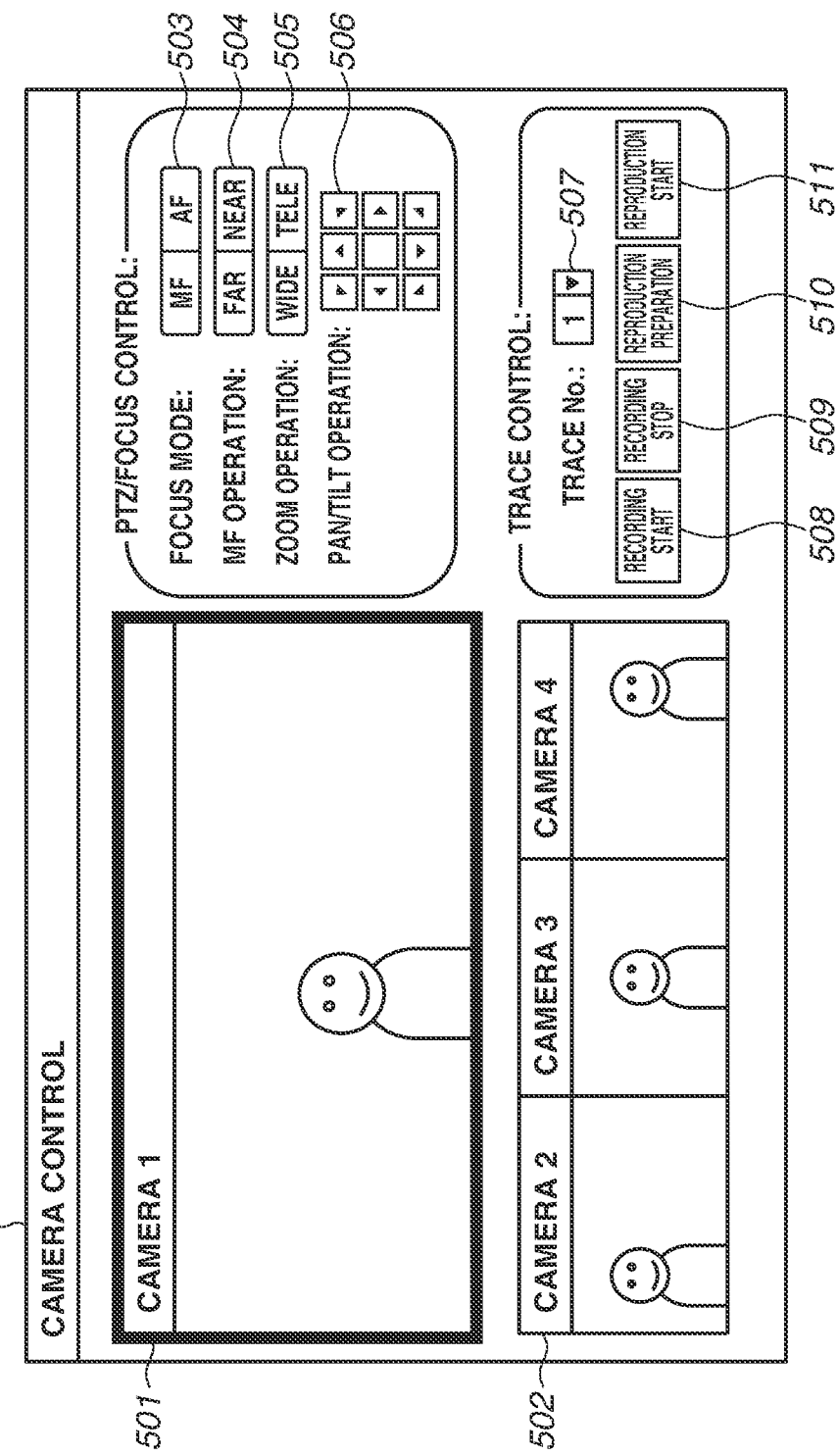

```
time[ms]
0          "pan": 500, "tilt": 100, "zoom": 300, "focus": 100, "Tally":red
100        "pan": 500, "tilt": 100, "zoom": 300, "focus": 100, "Tally":red
200        "pan": 490, "tilt": 110, "zoom": 290, "focus": 200, "Tally":red
...
10000      "pan": 300, "tilt": 150, "zoom": 200, "focus": 200, "Tally":green
...
180000     "pan": 200, "tilt": 200, "zoom": 100, "focus": 100, "Tally":red
```

```
time[ms]
0          "pan": 300, "tilt": 100, "zoom": 200, "focus": 200, "Tally":green
100        "pan": 300, "tilt": 100, "zoom": 200, "focus": 200, "Tally":green
200        "pan": 300, "tilt": 100, "zoom": 200, "focus": 200, "Tally":green
...
10000      "pan": 300, "tilt": 100, "zoom": 200, "focus": 200, "Tally":red
...
180000     "pan": 300, "tilt": 100, "zoom": 100, "focus": 200, "Tally":off
```

```
time[ms]
0          "pan": 200, "tilt": 150, "zoom": 300, "focus": 300, "Tally":off
100        "pan": 200, "tilt": 150, "zoom": 300, "focus": 300, "Tally":off
200        "pan": 200, "tilt": 150, "zoom": 300, "focus": 300, "Tally":off
...
10000      "pan": 200, "tilt": 150, "zoom": 300, "focus": 300, "Tally":off
...
180000     "pan": 200, "tilt": 150, "zoom": 300, "focus": 300, "Tally":off
```

```
time[ms]
0          "pan": 500, "tilt": 200, "zoom": 300, "focus": 400, "Tally":off
100        "pan": 500, "tilt": 200, "zoom": 300, "focus": 400, "Tally":off
200        "pan": 500, "tilt": 200, "zoom": 300, "focus": 400, "Tally":off
...
10000      "pan": 500, "tilt": 200, "zoom": 300, "focus": 400, "Tally":off
...
180000     "pan": 500, "tilt": 200, "zoom": 300, "focus": 400, "Tally":off
```

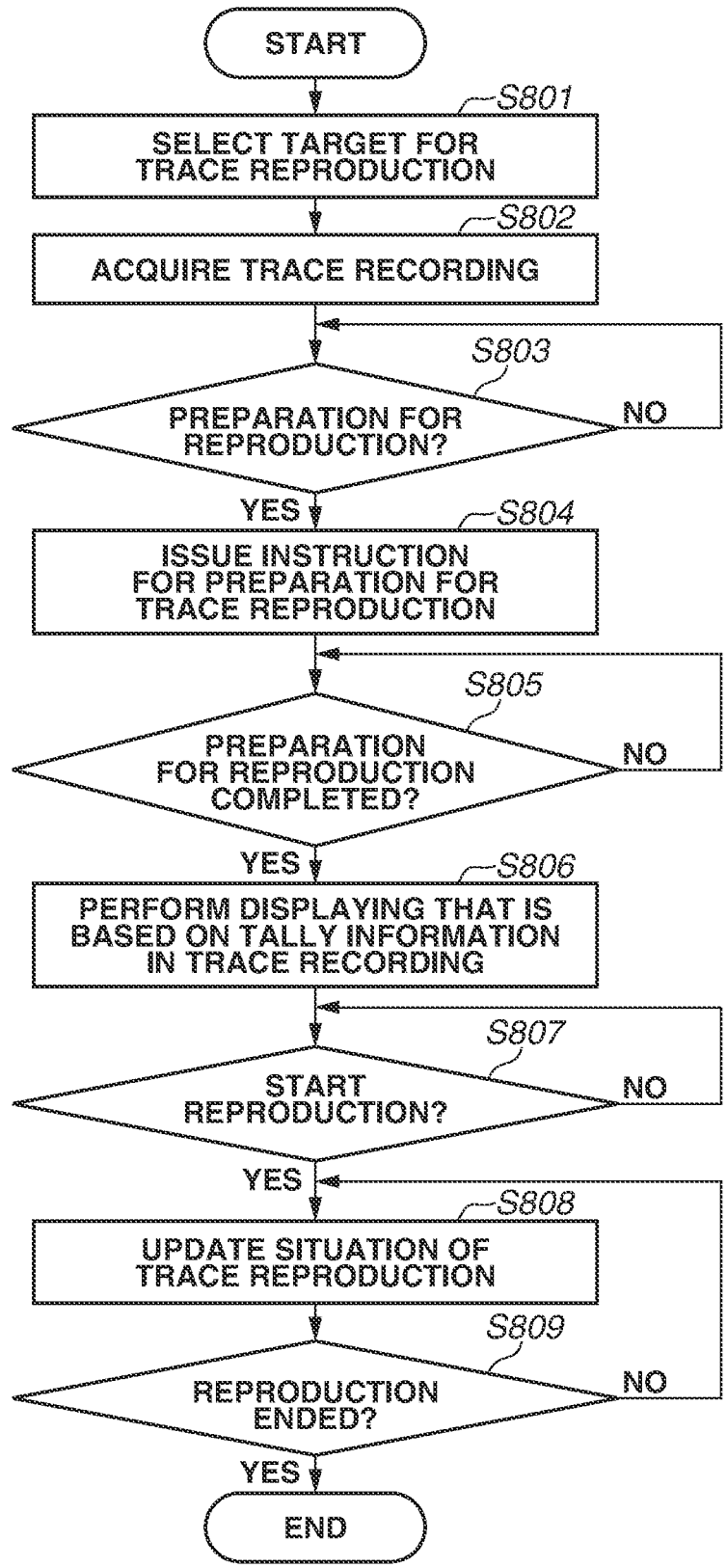

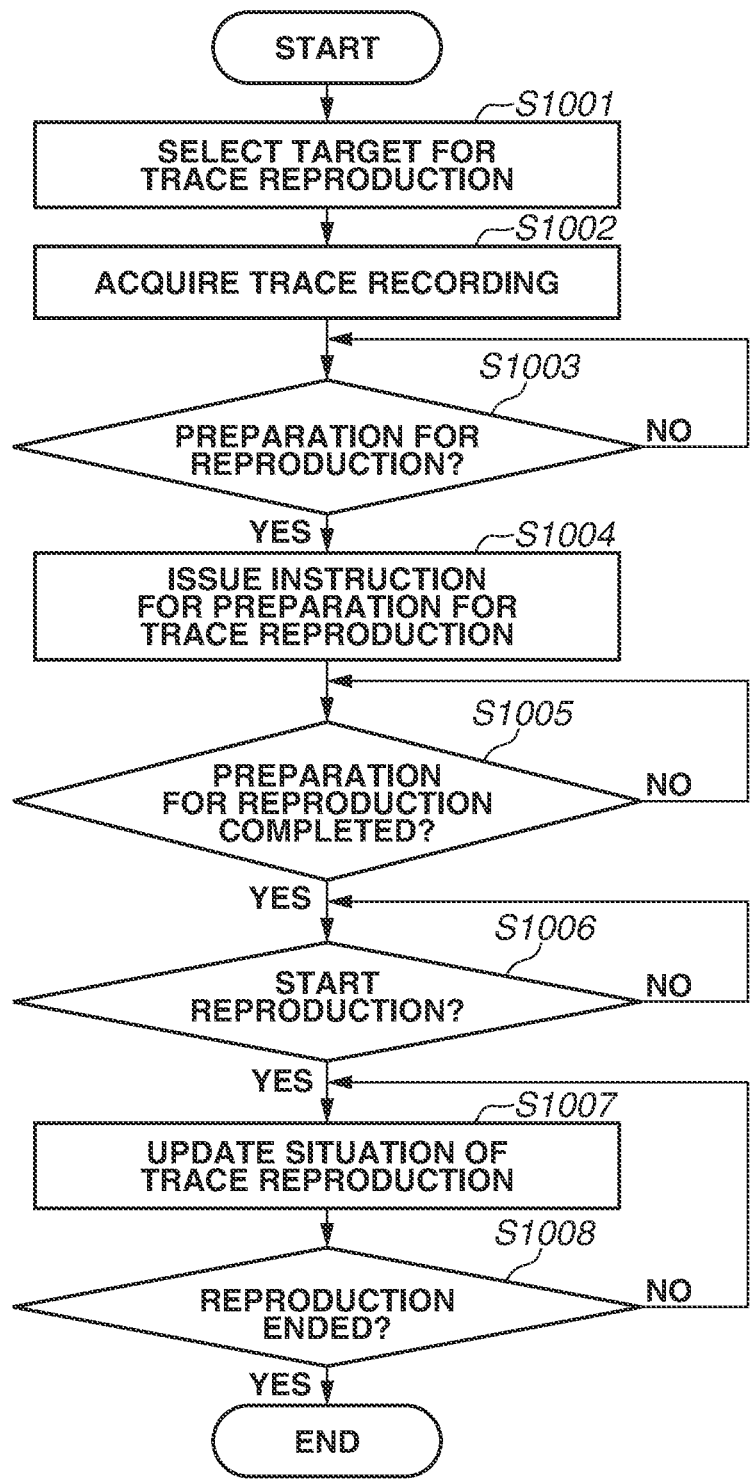

INFORMATION PROCESSING APPARATUS, INFORMATION PROCESSING METHOD, AND STORAGE MEDIUM

BACKGROUND OF THE DISCLOSURE

Field of the Disclosure

Aspects of the present disclosure generally relate to an information processing technique.

Description of the Related Art

Recently, along with the growth of moving image delivery markets, there have been increasing systems which perform image capturing in a wedding ceremony or a lecture meeting with use of an image capturing apparatus which is capable of being remotely controlled for performing moving image capturing via a network. With regard to an image capturing apparatus capable of being remotely operated, while a method of operating the image capturing apparatus with use of a hardware controller is usually used, a method of operating the image capturing apparatus with use of an application which operates on a personal computer (PC) or a mobile terminal is also in practical use. In such a case, while an operation on the image capturing apparatus is performed via a graphical user interface (GUI) on the application, a remote operation on a part of the image capturing apparatus can also be implemented by connecting hardware such as a joystick to the PC or the mobile terminal. Moreover, there is a trace function which stores a series of control operations performed by the user for pan, tilt, or zoom (PTZ) of the image capturing apparatus and then reproduces PTZ control to be performed by the user according to the stored series of control operations for PTZ. Japanese Patent Application Laid-Open No. 2012-5020 discusses a technique of storing and reproducing trace data which is a series of command values for pan, tilt, zoom, or focus.

Moreover, the above-mentioned system may be configured to, in a case where a plurality of image capturing apparatuses is interconnected, include a switcher which is operated by the operator to determine a video image captured by which image capturing apparatus to deliver depending on scenes. Each image capturing apparatus is equipped with a tally lamp, and the tally lamp is used in such a manner that the tally lamp of an image capturing apparatus selected by the switcher as a video image delivery source is lit red.

The technique discussed in Japanese Patent Application Laid-Open No. 2012-5020 is able to record a series of control operations performed by the user for PTZ, but does not take into consideration tally information for regulating whether to deliver a video image to an external apparatus. Accordingly, in a case where a person skilled in video production performs operations and trace recording is performed based on the operations and, then, a less experienced operator performs reproduction of the trace recording, the timing of video delivery is entrusted to the operator, so that a load may be put on the operator.

SUMMARY OF THE DISCLOSURE

Aspects of the present disclosure are generally directed to providing an information processing apparatus capable of reducing a load from being put on an operator in reproducing a trace recording.

According to an aspect of the present disclosure, an information processing apparatus includes a reception unit configured to receive a user operation for issuing an instruction for reproducing a trace recording having recorded therein information about (a) at least one of a pan value, a tilt value, a zoom value, and a value related to image quality conditions in a predetermined period for a first image capturing unit configured to capture an image and (b) tally information indicating a state of video delivery in the predetermined period of the first image capturing unit, and a control unit configured to control at least one of the pan value, the tilt value, the zoom value, and the value related to image quality conditions for the first image capturing unit according to the trace recording during a period in a case where the trace recording is being reproduced according to the user operation received by the reception unit, and to cause a display unit to display information indicating the state of video delivery of the first image capturing unit according to the tally information recorded in the trace recording.

According to another aspect of the present disclosure, an information processing apparatus includes a reception unit configured to receive a user operation for issuing an instruction for reproducing a trace recording having recorded therein information about (a) at least one of a pan value, a tilt value, a zoom value, and a value related to image quality conditions in a predetermined period for a first image capturing unit configured to capture an image and (b) tally information indicating a state of video delivery in the predetermined period of the first image capturing unit, and a control unit configured to control the state of video delivery of the first image capturing unit according to the tally information recorded in the trace recording during a period in a case where the trace recording is being reproduced according to the user operation received by the reception unit.

Further features of the present disclosure will become apparent from the following description of exemplary embodiments with reference to the attached drawings.

BRIEF DESCRIPTION OF THE DRAWINGS

FIGS. 5A and 5B are diagrams illustrating user interface (UI) screens.

FIGS. 7A, 7B, 7C, and 7D are diagrams used to explain trace recordings.

FIG. 8 is a flowchart illustrating the flow of processing for reproduction of a trace recording.

FIG. 10 is a flowchart illustrating the flow of processing for reproduction of a trace recording.

DESCRIPTION OF THE EMBODIMENTS

Various exemplary embodiments, features, and aspects of the present disclosure will be described in detail below with reference to the drawings. Furthermore, configurations described in the following exemplary embodiments are merely examples, and the exemplary embodiments are not limited to the illustrated configurations.

Figure 1:
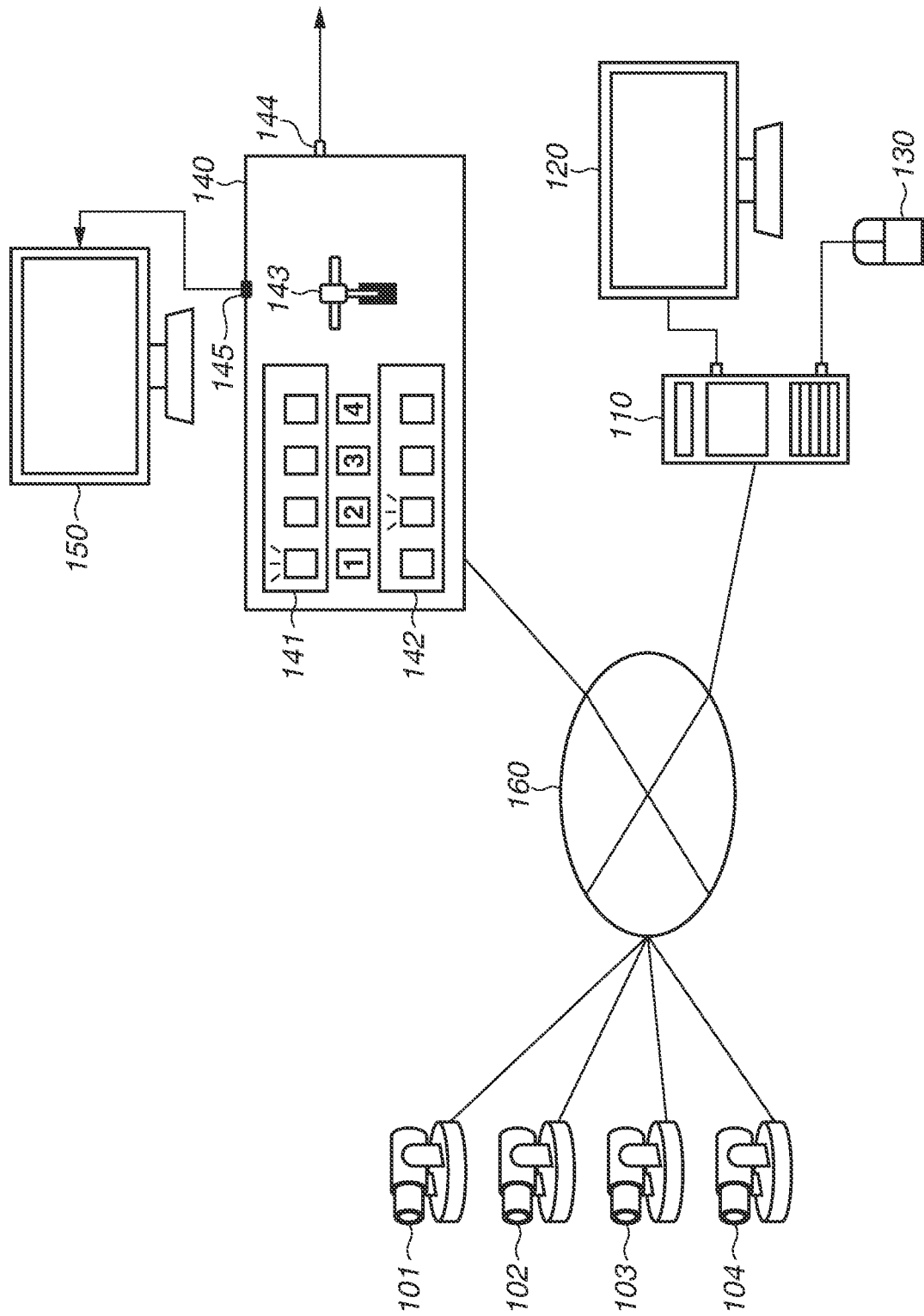
FIG. 1 is a diagram illustrating a system configuration.

FIG. 1 illustrates an example of a system configuration including a control apparatus in a first exemplary embodiment. The system in the first exemplary embodiment includes image capturing apparatuses 101 to 104, an information processing apparatus 110, a monitor 120, an input device 130, a switcher 140, a monitor 150, and a network 160.

The image capturing apparatuses 101 to 104, the information processing apparatus 110, and the switcher 140 are interconnected via the network 160 in such a state as to be able to communicate with each other.

Video data which is data about a video image captured by each of the image capturing apparatuses 101 to 104 is transmitted to the information processing apparatus 110 and the switcher 140 via the network 160. Furthermore, while the system in the first exemplary embodiment includes four image capturing apparatuses, the first exemplary embodiment is not limited to this, and the system can be configured to include image capturing apparatuses the number of which is other than four. Moreover, each of the image capturing apparatuses 101 to 104 in the first exemplary embodiment includes a pan, tilt, and zoom mechanism for controlling an image capturing range. The image capturing range is able to be controlled by the information processing apparatus 110 transmitting an instruction for pan, tilt, and zoom driving via the network 160. Furthermore, for communication with the switcher 140, not only the network 160 but also, for example, High-Definition Multimedia Interface® (HDMI®), serial digital interface (SDI), or serial connection can be used.

The information processing apparatus 110 is, for example, an apparatus, such as a personal computer, on which a program for implementing functions described below is installed. The information processing apparatus 110 is capable of outputting video data to the monitor 120 to cause the monitor 120 to display a video image and receiving inputting of a user operation performed on the input device 130, which is, for example, a mouse. In response to an input received from the input device 130, which is, for example, a mouse, the information processing apparatus 110 performs, for example, the following processing. Thus, the information processing apparatus 110 generates a control command for controlling, for example, driving of at least one of pan, tilt, and zoom or changing of focus of the image capturing apparatuses 101 to 104, and transmits the control command to an image capturing apparatus targeted for control via the network 160. The monitor 120, which is connected to the information processing apparatus 110 in such a state as to be able to communicate therewith, is a monitor used to display video data output from the information processing apparatus 110 or a user interface (UI) screen described below. The input device 130 is an input device used to perform inputting to the information processing apparatus 110, and is, for example, a mouse. Furthermore, the monitor 120 can be a touch display or can be configured to be able to receive an external input instead of the input device 130. Furthermore, the information processing apparatus 110 can be connected to a joystick for controlling an image capturing direction (pan and tilt (PT)) of at least one of the image capturing apparatuses 101 to 104.

Figure 2:
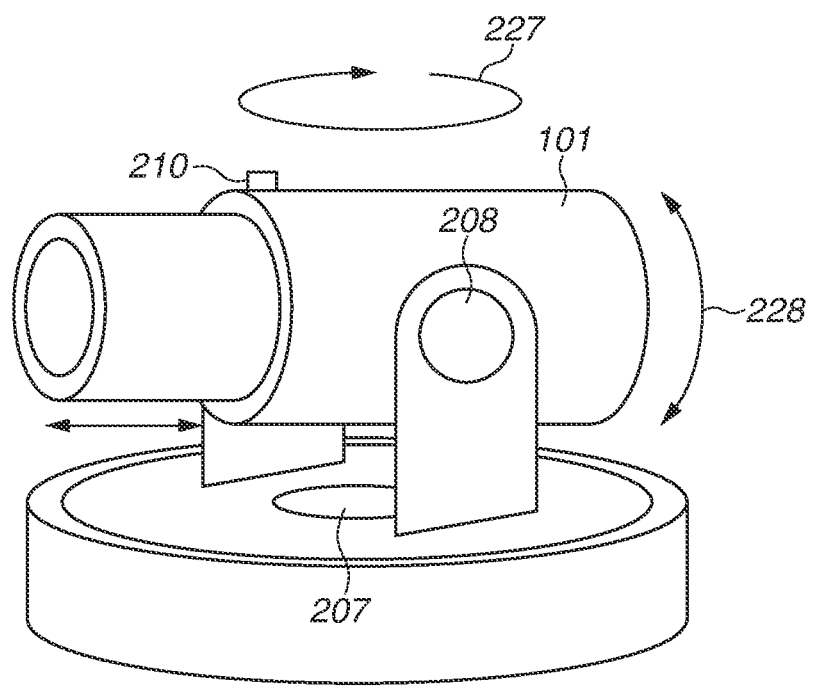
FIG. 2 is a diagram illustrating an outer appearance of an image capturing apparatus.

Furthermore, each of the image capturing apparatuses 101 to 104 in the first exemplary embodiment is equipped with a tally lamp 210. FIG. 2 illustrates an example of an outer appearance of the image capturing apparatus 101 in the first exemplary embodiment, which includes the tally lamp 210. In the first exemplary embodiment, each of the other image capturing apparatuses 102 to 104 also includes a specific tally lamp 210. The tally lamp 210 is lit red when the image capturing apparatus equipped with the tally lamp 210 is in a state in which a video image output from the image capturing apparatus equipped with the tally lamp 210 is being delivered to an external apparatus via the switcher 140, i.e., the video delivery state is a state of program being in execution (a first video delivery state). Moreover, the tally lamp 210 is lit green when the image capturing apparatus equipped with the tally lamp 210 is in a state in which a video image output from the image capturing apparatus equipped with the tally lamp 210 is next switched to a state of program being in execution, i.e., the video delivery state is a state of preview being in execution (a second video delivery state). Moreover, the tally lamp 210 is turned off when the image capturing apparatus equipped with the tally lamp 210 is in a state in which a video image output from the image capturing apparatus equipped with the tally lamp 210 is not delivered to an external apparatus via the switcher 140 (a third video delivery state) other than the first video delivery state and the second video delivery state. Furthermore, while the tally lamp 210 in the first exemplary embodiment is lit red if the video delivery state is a state of program being in execution and is lit green if the video delivery state is a state of preview being in execution, the tally lamp 210 can be configured to have only a function of being lit red when the video delivery state is a state of program being in execution or can be configured to be lit another color when the video delivery state is a state of program being in execution or a state of preview being in execution. For example, when receiving tally information indicating a current video delivery state from the switcher 140 via the network 160, each of the image capturing apparatuses 101 to 104 turns on or turns off the tally lamp 210 included in the image capturing apparatus itself according to the tally information.

The switcher 140 in the first exemplary embodiment includes program selection buttons 141, preview selection buttons 142, a switching lever 143, a video output terminal 144, and a monitor output portion 145. The program selection buttons 141 are buttons used to select video data output from which image capturing apparatus to output to an external apparatus from the video output terminal 144, from among pieces of video data received from the respective image capturing apparatuses 101 to 104 via the network 160. In other words, the program selection buttons 141 are buttons used to select any one of the image capturing apparatuses 101 to 104 as being in a state of program being in execution. The program selection buttons 141 include, for example, four buttons corresponding to No. 1 to No. 4, which correspond to the respective image capturing apparatuses 101 to 104. An image capturing apparatus corresponding to the button of a number selected by the user enters into a state of program being in execution, so that a video image captured by the corresponding image capturing apparatus is output from the video output terminal 144 to an external apparatus. Furthermore, if a button of the program selection buttons 141 is pressed to be selected, the selected button is lit, so that an image capturing apparatus selected as being in a state of program being in execution becomes discriminable by the operator. Moreover, in response to the button being selected, the switcher 140 performs the following processing. Thus, the switcher 140 transmits, to the image capturing apparatus corresponding to the selected button, tally information indicating that the corresponding image capturing apparatus is in a state of program being in execution. In response to receiving the tally information indicating that the corresponding image capturing apparatus is in a state of program being in execution, the corresponding image capturing apparatus lights the tally lamp 210 red. While, in the first exemplary embodiment, the program selection buttons 141 include four buttons corresponding to No. 1 to No. 4 and one video image to be output as a program video image can be selected from among camera video images output from up to four image capturing apparatuses, the number of buttons or the maximum number of image capturing apparatuses targeted for operation is not limited to this.

The preview selection buttons 142 are buttons used to select an image capturing apparatus to set the video delivery state thereof as a state of preview being in execution from among the image capturing apparatuses 101 to 104 via the network 160. Furthermore, an image capturing apparatus set as a state of preview being in execution is switched to a state of program being in execution in response to a switching operation being performed by the switching lever 143. Therefore, the user previously selects an image capturing apparatus serving as a candidate to be next set as a state of program being in execution by the preview selection buttons 142. As with the program selection buttons 141, the preview selection buttons 142 include a plurality of buttons corresponding to No. 1 to No. 4, which correspond to the respective image capturing apparatuses 101 to 104. The video delivery state of an image capturing apparatus corresponding to the selected number becomes a state of preview being in execution, so that a video image delivered from the corresponding image capturing apparatus becomes a preview video image. If a button of the preview selection buttons 142 is pressed to be selected, the selected button is lit, so that an image capturing apparatus selected as being in a state of preview being in execution becomes discriminable by the operator. Moreover, in response to a button of the preview selection buttons 142 being selected, the switcher 140 performs the following processing. Thus, the switcher 140 transmits, to the image capturing apparatus corresponding to the selected button, tally information indicating that the corresponding image capturing apparatus is in a state of preview being in execution. In response to receiving the tally information indicating that the corresponding image capturing apparatus is in a state of preview being in execution, the corresponding image capturing apparatus lights the tally lamp 210 thereof green. In the first exemplary embodiment, as with the program selection buttons 141, the preview selection buttons 142 include four buttons corresponding to No. 1 to No. 4 and one video image to be output as a preview video image can be selected from among camera video images output from up to four image capturing apparatuses. Furthermore, the number of buttons or the maximum number of image capturing apparatuses targeted for operation is not limited to this.

The switching lever 143 is a lever used to switch an image capturing apparatus which is currently in a state of preview being in execution to a state of program being in execution. For example, a case where a video image output from the image capturing apparatus 101 is allocated to the button of No. 1 and a video image output from the image capturing apparatus 102 is allocated to the button of No. 2 is described as an example. Suppose that, currently, the button of No. 1 (image capturing apparatus 101) of the program selection buttons 141 is selected as a state of program being in execution and the button of No. 2 (image capturing apparatus 102) of the preview selection buttons 142 is selected as a state of preview being in execution. If, in that state, the switching lever 143 is flipped down, the video delivery state as a state of preview being in execution is switched to a state of program being in execution and, conversely, the video delivery state as a state of program being in execution is switched to a state of preview being in execution.

Thus, if the switching lever 143 is flipped down, the button of No. 1 of the program selection buttons 141 is turned off and the button of No. 2 thereof is lit and the image capturing apparatus 102 having been in a state of preview being in execution is switched to a state of program being in execution, so that a video image output from the image capturing apparatus 102 is output from the video output terminal 144 to an external apparatus. At the same time, the button of No. 2 of the preview selection buttons 142 is turned off and the button of No. 1 thereof is lit and the image capturing apparatus 101 having been in a state of program being in execution is switched to a state of preview being in execution. Along with this switching, the switcher 140 transmits, to the image capturing apparatus 101, information indicating that the image capturing apparatus 101 has entered into a state of preview being in execution. Moreover, the switcher 140 transmits, to the image capturing apparatus 102, information indicating that the image capturing apparatus 102 has entered into a state of program being in execution.

The video output terminal 144 is a terminal used to output the above-mentioned program video image, and outputs a video image output from an image capturing apparatus which is in a state of program being in execution, to an external apparatus (e.g., live stream equipment or a program recording apparatus) connected to the switcher 140 via, for example, a network.

The monitor output portion 145 generates a video image in which a plurality of video images received from the respective image capturing apparatuses 101 to 104 via the network 160 is arranged side by side, and outputs the generated video image to the monitor 150. Moreover, the monitor output portion 145 also outputs a setting screen for use in performing setting of the switcher 140. The monitor 150 displays a video image output from the switcher 140 for monitor output, and also displays a setting screen output from the switcher 140.

The network 160 can be implemented with, for example, the Internet, a wired local area network (wired LAN), a wireless LAN, or a wide area network (WAN).

Furthermore, while, in the system in the first exemplary embodiment, the information processing apparatus 110 and the switcher 140 are separate bodies, the first exemplary embodiment is not limited to this, and, for example, the information processing apparatus 110 and the switcher 140 can be the same body. Thus, the information processing apparatus 110 can be configured to include the function of the switcher 140.

Figure 3:
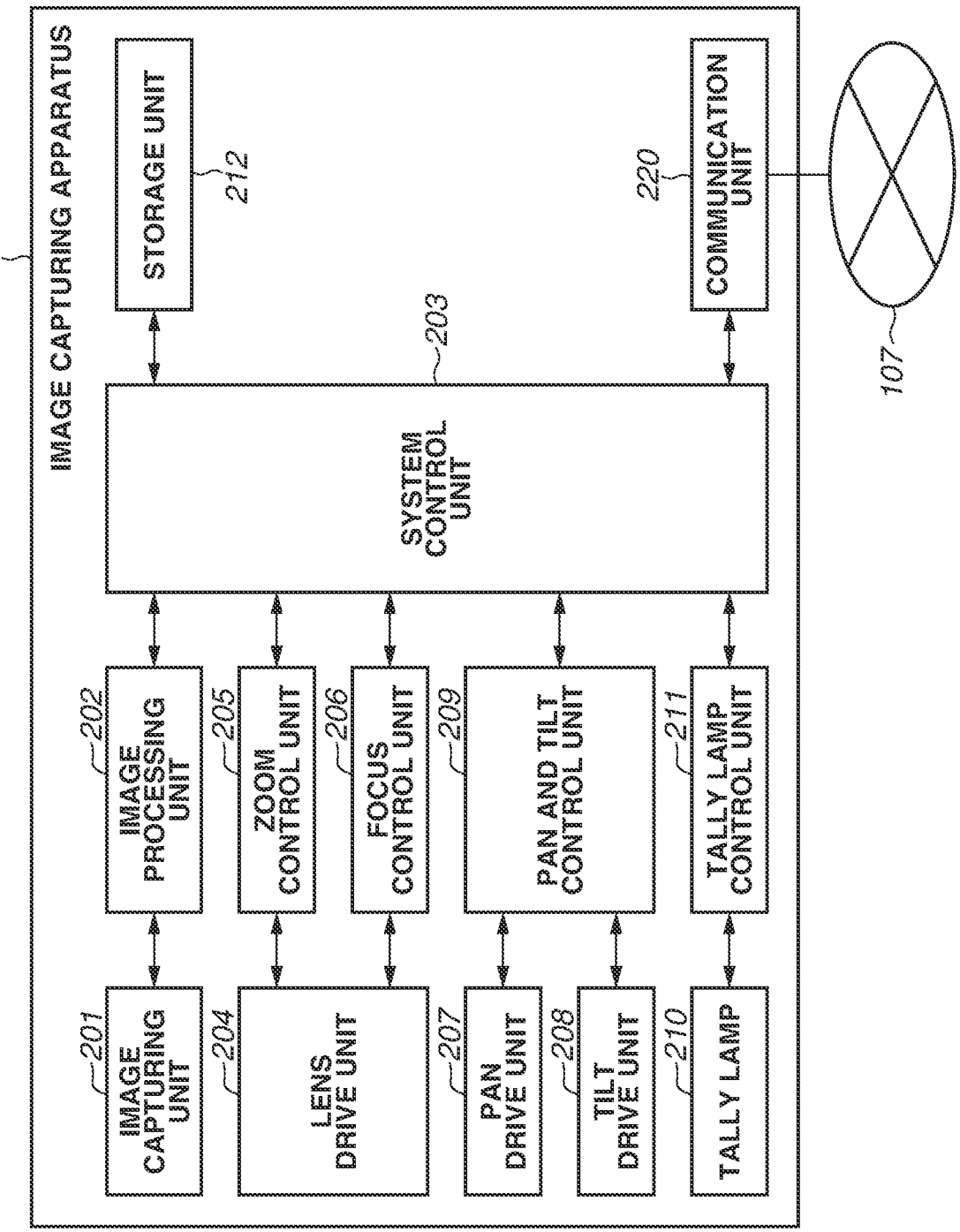
FIG. 3 is a diagram illustrating functional blocks of the image capturing apparatus.

Next, functional blocks of the image capturing apparatus 101 in the first exemplary embodiment are described with reference to FIG. 3, but, assuming that each of the image capturing apparatuses 102 to 104 also includes the same functional blocks, functional blocks of each of the image capturing apparatuses 102 to 104 are omitted from description.

Among the functional blocks of the image capturing apparatus 101 illustrated in FIG. 3, the respective functions of, for example, an image processing unit 202, a system control unit 203, a zoom control unit 205, a focus control unit 206, a pan and tilt control unit 209, a tally lamp control unit 211, a storage unit 212, and a communication unit 220 are assumed to be implemented as follows. Thus, each function is implemented by a central processing unit (CPU) 1100 of the image capturing apparatus 101, described below with reference to FIG. 11, executing a computer program stored in a read-only memory (ROM) 1120 of the image capturing apparatus 101.

An image capturing unit 201 of the image capturing apparatus 101 is configured with an image sensor (not illustrated), such as a charge-coupled device (CCD) sensor or a complementary metal-oxide semiconductor (CMOS) sensor. Then, the image capturing unit 201 photoelectrically converts a subject image formed through a lens to generate an electrical signal.

The image processing unit 202 performs processing for converting an electrical signal obtained by photoelectrical conversion performed by the image capturing unit 201 into a digital signal and image processing such as compression coding processing to generate video data, and transfers the generated video data to the system control unit 203.

Figure 11:
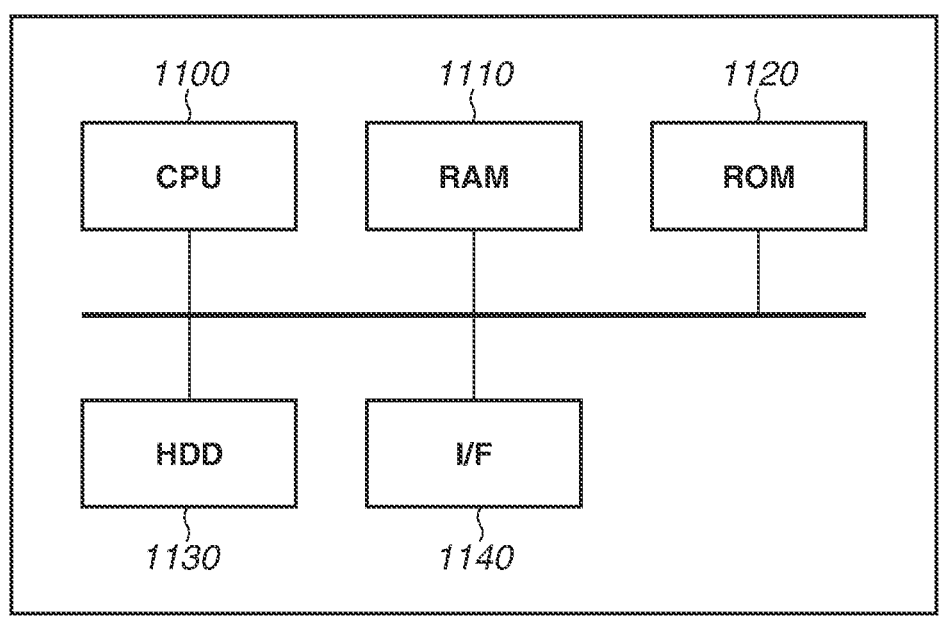
FIG. 11 is a diagram illustrating a hardware configuration of each apparatus.

The system control unit 203, which is implemented by the CPU 1100 described below with reference to FIG. 11, controls the entire image capturing apparatus 101. Moreover, the system control unit 203 performs control to transfer the generated video data to the communication unit 220. Moreover, the system control unit 203 also issues an instruction for changing image capturing parameters for, for example, setting of image quality adjustment to the image processing unit 202, and the image capturing unit 201 and the image processing unit 202 perform control of image capturing parameters based on the transferred instruction. Moreover, the system control unit 203 performs processing for storing, in the storage unit 212, for example, parameters for image quality adjustment, setting values such as video output processing, and settings related to pan and tilt.

Moreover, when having received a request command for video data transmitted from the information processing apparatus 110, the system control unit 203 transmits video data generated by the image processing unit 202 to the information processing apparatus 110 via the communication unit 220.

Moreover, when having received a request command for current values of pan, tilt, and zoom (PTZ) and focus transmitted from the information processing apparatus 110, the system control unit 203 performs the following processing. Thus, the system control unit 203 reads the current values of current PTZ and focus from, for example, the zoom control unit 205, the focus control unit 206, and the pan and tilt control unit 209. Then, the system control unit 203 transmits information about the read current values to the information processing apparatus 110 via the communication unit 220.

Additionally, the system control unit 203 analyzes control commands for controlling pan, tilt, and zoom, which the communication unit 220 has received from the information processing apparatus 110 via the network 160, and issues instructions to the zoom control unit 205 and the pan and tilt control unit 209. Moreover, the system control unit 203 analyzes tally information received via the network 160, specifies a video deliver state of the image capturing apparatus 101 itself, and issues an instruction to the tally lamp control unit 211. For example, when having received, from the switcher 140, tally information indicating that the image capturing apparatus 101 itself is in a state of program being in execution, the system control unit 203 issues an instruction to the tally lamp control unit 211 to light the tally lamp 210 red. The tally lamp control unit 211 performs control to light the tally lamp 210 red according to the instruction. Moreover, when having received tally information indicating that the image capturing apparatus 101 is in the third video delivery state, the system control unit 203 issues an instruction to the tally lamp control unit 211 to turn off the tally lamp 210. The tally lamp control unit 211 turns off the tally lamp 210 according to the instruction.

A pan drive unit 207 is configured with a mechanical drive system for performing a pan operation, a motor serving as a drive source thereof, and an angle sensor for detecting the angle of a drive portion. Then, in the pan drive unit 207, in response to the motor being driven, the pan drive mechanism is driven in a pan direction 227 (in other words, the image capturing direction being changed to a horizontal direction relative to the mounting surface). A tilt drive unit 208 is configured with a mechanical drive system for performing a tilt operation, a motor serving as a drive source thereof, and an angle sensor for detecting the angle of a drive portion. Then, in the tilt drive unit 208, in response to the motor being driven, the tilt drive mechanism is driven in a tilt direction 228 (in other words, the image capturing direction being changed to a vertical direction relative to the mounting surface). The pan and tilt control unit 209 controls the pan drive unit 207 and the tilt drive unit 208 based on an instruction signal transferred from the system control unit 203. A lens drive unit 204 is configured with mechanical drive systems for a focus lens and a zoom lens, motors serving as drive sources thereof, and position sensors for detecting the positions of drive portions, and an operation of the lens drive unit 204 is controlled by the zoom control unit 205 and the focus control unit 206. The zoom control unit 205 performs control of the lens drive unit 204 based on an instruction signal transferred from the system control unit 203. Moreover, the focus control unit 206 issues an instruction to the lens drive unit 204 to control the position of the focus lens based on a focus value transferred from the system control unit 203 and designated by, for example, the information processing apparatus 110. The position of the focus lens being changed causes the focus value to be changed.

The storage unit 212 stores, for example, programs and setting values which are to be used in the system control unit 203, and is subjected to reading and writing by the system control unit 203. The communication unit 220 performs communications with apparatuses or devices, such as the information processing apparatus 110 and the switcher 140, via the network 160, and performs communication processing for transferring the received communication data to the system control unit 203 and transmitting communication data transferred from the system control unit 203. Moreover, for example, the communication unit 220 transmits video data generated by the image processing unit 202 to the information processing apparatus 110 and the switcher 140 via the network 160. Moreover, the communication unit 220 receives a control command transmitted from the information processing apparatus 110, and outputs the received control command to the system control unit 203. Then, the communication unit 220 transmits a response to the information processing apparatus 110 according to an instruction of the system control unit 203.

Furthermore, the respective PTZ values of the image capturing apparatus 101 are determined by the pan value, the tilt value, and the zoom value of the image capturing apparatus 101. Furthermore, the pan value is an angle of the image capturing direction (optical axis) in the pan direction 227 of the image capturing apparatus 101 with one of drive ends of the pan drive unit 207 set to 0°. Moreover, the tilt value is an angle of the image capturing direction (optical axis) in the tilt direction 228 of the image capturing apparatus 101 with one of drive ends of the tilt drive unit 208 set to 0°. Furthermore, the zoom value of the image capturing apparatus 101 when an image is captured by the image capturing apparatus 101 is calculated from the focal length of the zoom lens.

Figure 4:
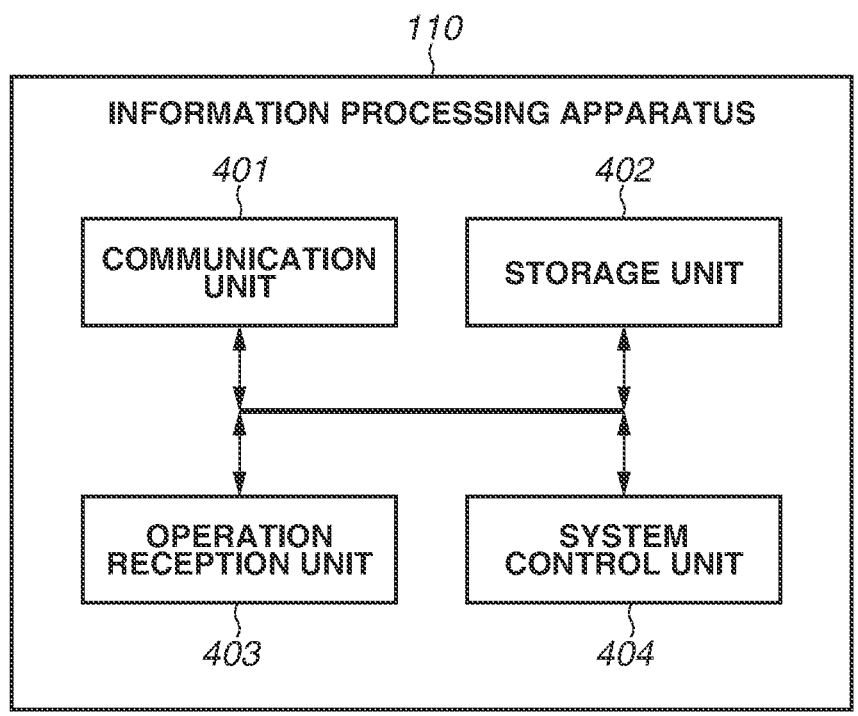
FIG. 4 is a diagram illustrating functional blocks of an information processing apparatus.

Next, the information processing apparatus 110 is described in more detail with reference to functional blocks of the information processing apparatus 110 illustrated in FIG. 4. Furthermore, each function of the information processing apparatus 110 illustrated in FIG. 4 is implemented by a CPU 1100 of the information processing apparatus 110, described below with reference to FIG. 11, executing a computer program stored in a ROM 1120 of the information processing apparatus 110.

A communication unit 401 acquires video data about a video image delivered from each of the image capturing apparatuses 101 to 104 via an interface (I/F) 1140, described below with reference to FIG. 11. Moreover, the communication unit 401 acquires tally information indicating a current video delivery state from each of the image capturing apparatuses 101 to 104. Furthermore, the communication unit 401 can be configured to acquire tally information indicating a video delivery state of each of the image capturing apparatuses 101 to 104 from the switcher 140. Moreover, the communication unit 401 transmits, to the image capturing apparatuses 101 to 104, control commands for controlling the image capturing apparatuses 101 to 104.

A storage unit 402 stores, for example, tally information indicating the latest video delivery state of each of the image capturing apparatuses 101 to 104. An operation reception unit 403 receives information about a user operation which is performed via the input device 130.

A system control unit 404 controls the entire information processing apparatus 110. For example, the system control unit 404 generates control commands for controlling the image capturing apparatuses 101 to 104, such as control commands for controlling PTZ and focus, and transmits the generated control commands to at least any one of the image capturing apparatuses 101 to 104 targeted for control. Moreover, the system control unit 404 also serves as a display control unit and causes the monitor 120 to display a video image that is based on video data transmitted from the image capturing apparatuses 101 to 104.

Figure 5A:
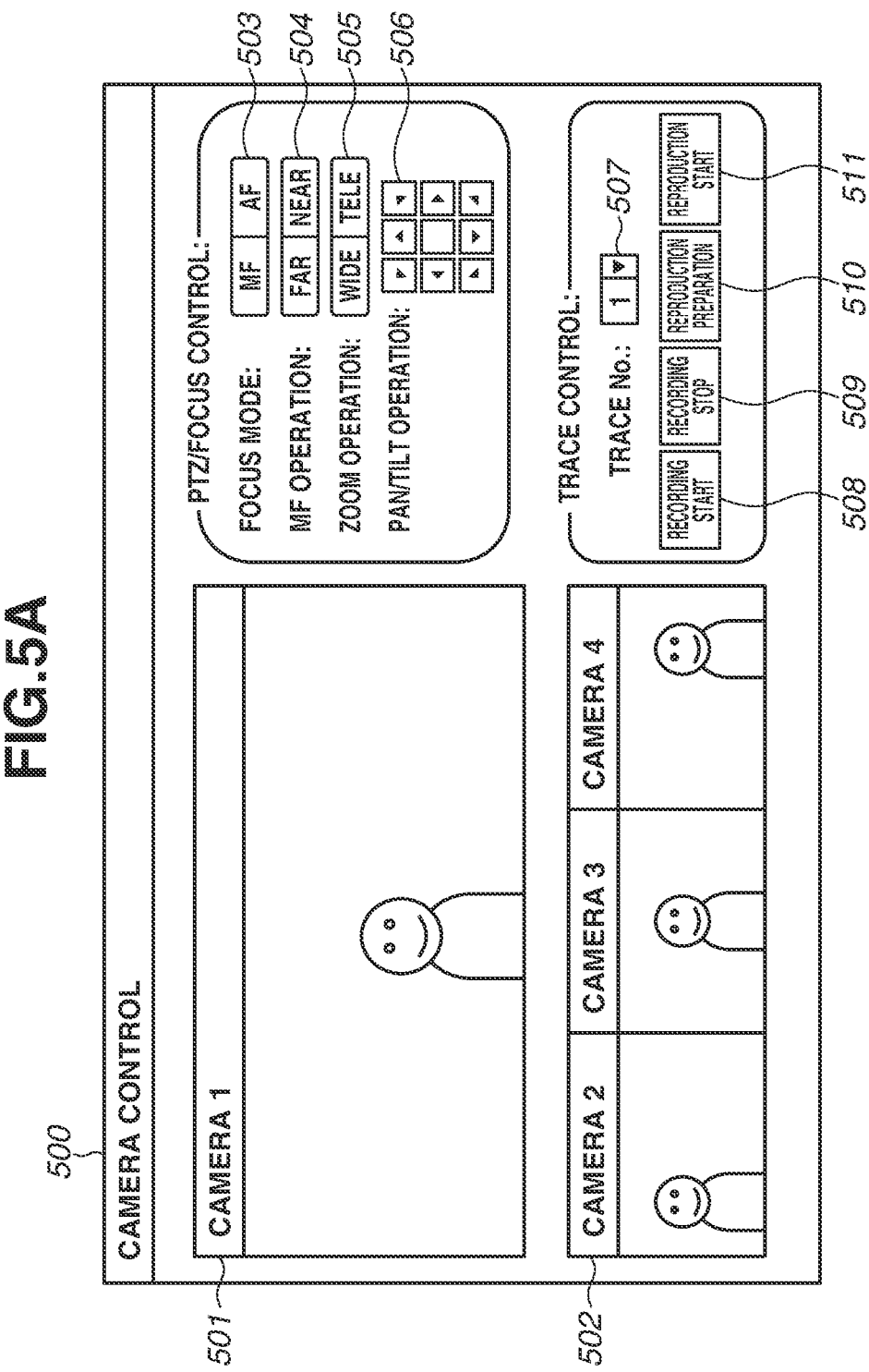

Next, information processing in the first exemplary embodiment is described with reference to FIGS. 5A and 5B. A user interface (UI) screen 500 illustrated in FIG. 5A is an example of a screen of a user interface which is displayed on the monitor 120 by the system control unit 404 of the information processing apparatus 110 in the first exemplary embodiment. In the UI screen 500, video images output from a plurality of image capturing apparatuses are displayed simultaneously, and the user is able to perform control of PTZ, trace recording, and reproduction of a trace recording. In the example illustrated in FIG. 5A, the system control unit 404 causes video images output from the image capturing apparatuses 101 to 104 to be displayed side by side on the UI screen 500, and also causes pieces of discrimination information "camera 1" to "camera 4" about the respective image capturing apparatuses 101 to 104 to be displayed at upper portions of the respective video images.

Moreover, as illustrated in FIG. 5A, the system control unit 404 causes a video image output from the image capturing apparatus 101 corresponding to "camera 1" to be displayed in a main video window 501 and causes video images output from the image capturing apparatuses 102 to 104 corresponding to "camera 2" to "camera 4" to be displayed in a sub video window 502.

Furthermore, a video image output from an image capturing apparatus selected by the user as a current control target is assumed to be displayed in the main video window 501, and video images output from the other image capturing apparatuses are assumed to be displayed in the sub video window 502. In the example illustrated in FIG. 5A, the image capturing apparatus 101 is assumed to be selected as a current control target, and a video image output from the image capturing apparatus 101 is displayed larger than video images output from the image capturing apparatuses 102 to 104 serving as the other image capturing apparatuses.

Moreover, the communication unit 401 acquires tally information from the image capturing apparatuses 101 to 104 or the switcher 140, and, for example, the system control unit 404 changes a display manner of the frame of a portion in which a video image is displayed in the UI screen 500 according to the acquired tally information. For example, when having acquired tally information indicating that the image capturing apparatus 101 is currently in a state of program being in execution (first video delivery state), the system control unit 404 changes the display manner of the frame of the main video window 501 to a thick frame, as illustrated in FIG. 5B. This causes the user to expressly recognize the current video delivery system of each image capturing apparatus.

Moreover, the UI screen 500 includes a window for PTZ/FOCUS control related to control of PTZ and focus, and the window for PTZ/FOCUS control includes a mode operation portion 503, an MF operation portion 504, a ZOOM operation portion 505, and a PAN/TILT operation portion 506. The mode operation portion 503 allows the user to switch between autofocus (AF) and manual focus (MF) of focus of an image capturing apparatus serving as a control target, and the MF operation portion 504 allows the user to set focus at the time of MF setting to FAR (far focus) or NEAR (near focus). In other words, the user is allowed to adjust a focus value at the time of MF setting by operating the MF operation portion 504. The ZOOM operation portion 505 and the PAN/TILT operation portion 506 are operation portions used to change a pan value, a tilt value, and a zoom value of an image capturing apparatus serving as a control target. Furthermore, information about the current focus mode, the focus value, the pan value, the tilt value, and the zoom value of an image capturing apparatus serving as a current control target can be configured to be displayed on the UI screen 500. Furthermore, the system control unit 404 generates control commands for controlling an image capturing apparatus serving as a control target according to a user operation performed on the mode operation portion 503, the MF operation portion 504, the ZOOM operation portion 505, and the PAN/TILT operation portion 506, and then transmits the generated control commands to the image capturing apparatus concerned.

Moreover, in the UI screen 500, a window for trace control related to control of a trace function is displayed, and the window for trace control includes a trace No. setting portion 507, a recording start button 508, a recording stop button 509, a reproduction preparation button 510, and a reproduction start button 511. The trace No. setting portion 507 indicates discrimination information for discriminating each of a plurality of trace recordings. The recording start button 508 is a button used to start trace recording, and the recording stop button 509 is a button used to stop trace recording. Here, for example, suppose a case where, as illustrated in FIG. 5A, a value "1" is selected in the trace No.

setting portion 507. At this time, in a period from when the recording start button 508 is pressed to when the recording stop button 509 is pressed, the following information is recorded. Thus, a series of changes of at least one of a pan value, a tilt value, a zoom value, and a value related to image quality conditions of each of the image capturing apparatuses 101 to 104 that are based on a user operation in the window for PTZ/FOCUS control is recorded as a trace recording in association with the value "1" of the trace No. setting portion 507. Furthermore, the image quality conditions mentioned here are conditions for regulating an image quality of the captured image, and the value related to image quality conditions is a focus value in the case of the first exemplary embodiment.

Furthermore, the value related to image quality conditions can be not only a focus value but also, for example, a parameter for adjusting exposure compensation, aperture value, or shutter speed. Thus, the value related to image quality conditions is at least one of a focus value, a value for adjusting exposure compensation, an aperture value, and a shutter speed. Furthermore, while the information processing apparatus 110 in the first exemplary embodiment further records a series of pieces of tally information as parameters for the respective image capturing apparatuses 101 to 104 which are recorded during a period from when the recording start button 508 is pressed until the recording stop button 509 is pressed, this processing is described below. In a case where the reproduction preparation button 510 has been pressed, the system control unit 404 performs the following processing. Thus, the system control unit 404 generates a control command for controlling an image capturing apparatus serving as a parameter associated with the time of start among a series of parameters which are recorded in a trace recording associated with the current value of the trace No. setting portion 507, and transmits the generated control command to the image capturing apparatus concerned. For example, suppose a case where the value "1" of the trace No. setting portion 507 is currently selected. Here, in a case where the reproduction preparation button 510 has been pressed, the system control unit 404 performs the following processing.

Thus, the system control unit 404 generates a control command serving as a pan value, a tilt value, a zoom value, and a value related to image quality conditions (focus value) in the time of start of each of the image capturing apparatuses 101 to 104 in a trace recording associated with the value "1" of the trace No. setting portion 507, and transmits the generated control command to each of the image capturing apparatuses 101 to 104. In a case where the reproduction start button 511 has been pressed, the system control unit 404 reproduces a trace recording associated with the currently selected value of the trace No. setting portion 507. In other words, the system control unit 404 controls each of the image capturing apparatuses 101 to 104 according to a series of a pan value, a tilt value, a zoom value, and a value related to image quality conditions of the trace recording associated with the currently selected value of the trace No. setting portion 507. At this time, each of the image capturing apparatuses 101 to 104 is controlled in the same way as changes of a series of a pan value, a tilt value, a zoom value, and a value related to image quality conditions recorded in the trace recording.

Figure 6:
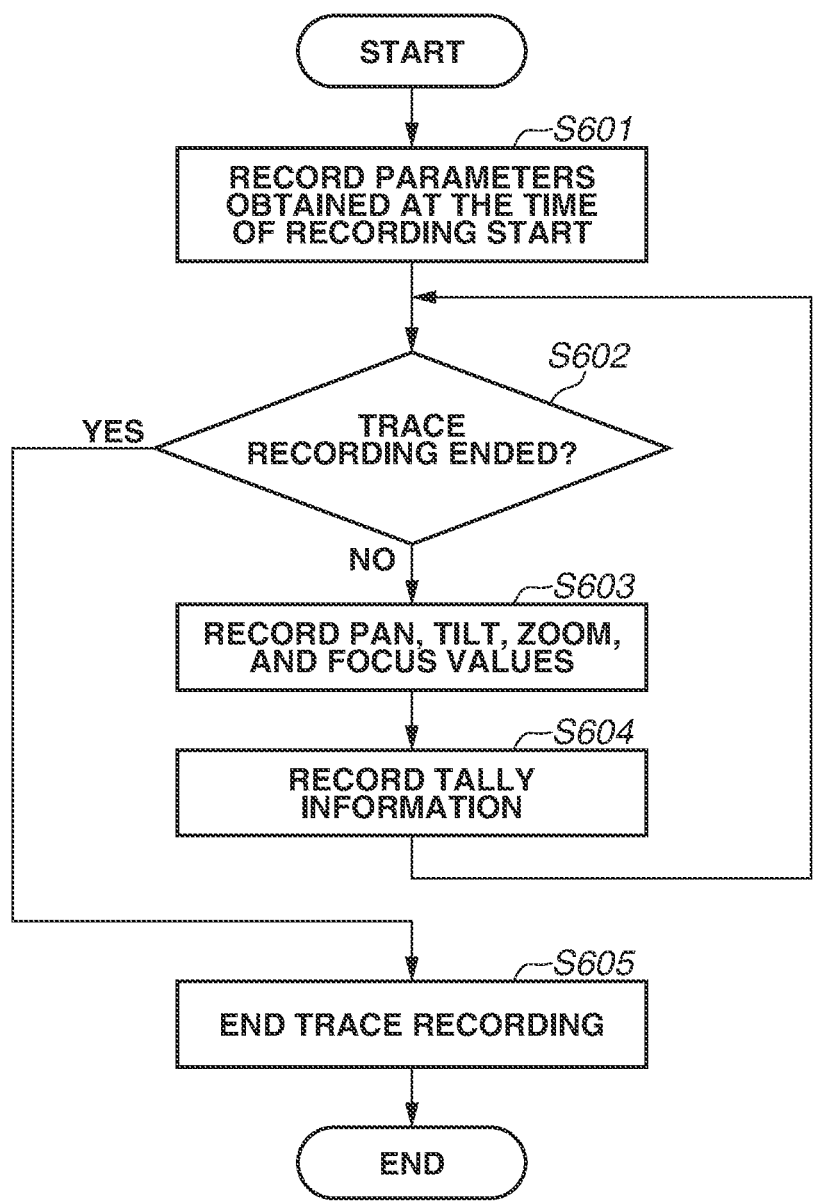
FIG. 6 is a flowchart illustrating the flow of processing for trace recording.

Here, processing for trace recording in the first exemplary embodiment is described with reference to the flowchart of FIG. 6. Furthermore, processing in the flow illustrated in FIG. 6 is performed by, for example, functional blocks of the information processing apparatus 110 illustrated in FIG. 4, which are executed by the CPU 1100 of the information processing apparatus 110 executing a computer program stored in the ROM 1120 of the information processing apparatus 110. Furthermore, processing in the flow illustrated in FIG. 6 is assumed to be started in response to the operation reception unit 403 receiving a user operation for pressing the recording start button 508 in the UI screen 500 displayed on the monitor 120.

First, in step S601, the system control unit 404 acquires parameters of each of the image capturing apparatuses 101 to 104 as parameters obtained at the time of recording start, and records the acquired parameters in a trace recording. Furthermore, the trace recording is recorded in the storage unit 402. Furthermore, while, in the first exemplary embodiment, parameters to be recorded in a trace recording are assumed to be a pan value, a tilt value, a zoom value, and a value related to image quality conditions of each of the image capturing apparatuses 101 to 104 and tally information about each of the image capturing apparatuses 101 to 104, the first exemplary embodiment is not limited to this. For example, the parameters can be at least one of a pan value, a tilt value, a zoom value, and a value related to image quality conditions of each of the image capturing apparatuses 101 to 104 and tally information about each of the image capturing apparatuses 101 to 104, or any further parameter such as an exposure value can also be recorded.

Next, in step S602, the system control unit 404 determines whether trace recording has ended.

For example, the system control unit 404 determines whether the recording stop button 509 in the UI screen 500 illustrated in FIG. 5A has been pressed. Then, if it is determined that the recording stop button 509 has been pressed by the user, the system control unit 404 determines that trace recording has ended, and, if it is determined that the recording stop button 509 has not been pressed by the user, the system control unit 404 determines that trace recording has not yet ended. If it is determined that trace recording has not yet ended (NO in step S602), the system control unit 404 advances the processing to step S603. In step S603, the system control unit 404 records, in a trace recording, a pan value, a tilt value, a zoom value, and a value related to image quality conditions of each of the current image capturing apparatuses 101 to 104 and a time elapsed from starting of trace recording while associating them with each other. In step S604, the system control unit 404 records, in a trace recording, tally information about each of the current image capturing apparatuses 101 to 104 and a time elapsed from starting of trace recording while associating them with each other. After processing in step S604, the system control unit 404 advances the processing to step S602 and then repeats processing in step S602. Then, if, in step S602, it is determined that trace recording has ended (YES in step S602), the system control unit 404 advances the processing to step S605, in which the system control unit 404 ends trace recording and the storage unit 402 records the currently selected value of the trace No. setting portion 507 and the trace recording while associating them with each other. Furthermore, for a predetermined period until it is determined that the recording stop button 509 has been pressed and the trace recording has ended, the user can control each of the image capturing apparatuses 101 to 104 via the UI screen 500 and can change tally information about each of the image capturing apparatuses 101 to 104 by operating the switcher 140. Thus, during a predetermined period from when the recording start button 508 is pressed until the recording stop button 509 is pressed, the system control unit 404 records the following parameters as a trace recording by the processing illustrated in FIG. 6. Thus, the system control unit 404 is able to record, as a trace recording, a series of pan values, tilt values, zoom values, values related to image quality conditions, and tally information about each of the image capturing apparatuses 101 to 104 in the predetermined period.

Trace recordings 701 to 704 illustrated in FIGS. 7A, 7B, 7C, and 7D are examples of trace recordings of the respective image capturing apparatuses 101 to 104, which are generated by the system control unit 404 via the processing in the flow illustrated in FIG. 6 and are recorded by the storage unit 402. Here, a case where the processing in the flow illustrated in FIG. 6 has been performed in response to the recording start button 508 being pressed with the value "1" of the trace No. setting portion 507 selected and the processing illustrated in FIG. 6 has ended in response to the recording stop button 509 being pressed is supposed. At this time, the trace recordings 701 to 704 associated with the value "1" of the trace No. setting portion 507 correspond to trace recordings for the image capturing apparatuses 101 to 104, respectively. Thus, the trace recording 701 is a trace recording for the image capturing apparatus 101, the trace recording 702 is a trace recording for the image capturing apparatus 102, the trace recording 703 is a trace recording for the image capturing apparatus 103, and the trace recording 704 is a trace recording for the image capturing apparatus 104. As illustrated in FIGS. 7A to 7D, the system control unit 404 in the first exemplary embodiment records, as a trace recording, a series of parameters of a pan value, a tilt value, a zoom value, a value related to image quality conditions, and tally information during a predetermined period with respect to each of the image capturing apparatuses 101 to 104. In the examples illustrated in FIGS. 7A to 7D, such parameters are successively recorded from the start of trace recording during a period of 180,000 milliseconds (ms). Furthermore, while, as illustrated in FIGS. 7A to 7D, there are "red", "green", and "off" as respective pieces of tally information, "red" is assumed to indicate the first video delivery state, "green" is assumed to indicate the second video delivery state, and "off" is assumed to indicate the third video delivery state. Thus, a trace recording in the first exemplary embodiment includes information about a period of the first video delivery state, information about a period of the second video delivery state, and information about a period of the third video delivery state in a predetermined period of trace recording (in FIGS. 7A to 7D, 0 ms to 180,000 ms). Furthermore, the first exemplary embodiment is not limited to this, and a trace recording can be configured to include only information about a period of the first video delivery state and information about a period of the third video delivery state in a predetermined period of trace recording. Furthermore, while, in the above description, the trace recordings 701 to 704 are assumed to be recorded (retained) by the information processing apparatus 110, the first exemplary embodiment is not limited to this. Thus, the respective trace recordings 701 to 704 can be configured to be recorded and retained by the corresponding image capturing apparatuses. Specifically, in response to the recording start button 508 of the UI screen 500 being pressed by the user, the information processing apparatus 110 transmits a control command indicating the start of trace recording to each of the image capturing apparatuses 101 to 104. Moreover, in response to the recording stop button 509 of the UI screen 500 being pressed by the user, the information processing apparatus 110 transmits a control command indicating the stop of trace recording to each of the image capturing apparatuses 101 to 104. Then, each of the image capturing apparatuses 101 to 104 performs the following processing during a predetermined period from the time of acquiring a control command indicating the start of trace recording to the time of acquiring a control command indicating the stop of trace recording. Thus, each of the image capturing apparatuses 101 to 104 generates and records a corresponding one of trace recordings illustrated in FIGS. 7A to 7D according to control commands for PTZ and focus transmitted from the information processing apparatus 110 and tally information transmitted from the switcher 140. In this way, the trace recordings 701 to 704 can be recorded and retained by the respective image capturing apparatuses 101 to 104.

Next, processing for reproduction of a trace recording in the first exemplary embodiment is described with reference to FIG. 8. Furthermore, processing in the flow illustrated in FIG. 8 is performed by functional blocks of the information processing apparatus 110, which are implemented by the CPU 1100 of the information processing apparatus 110 executing a computer program stored in the ROM 1120 of the information processing apparatus 110.

First, in step S801, the operation reception unit 403 receives a user operation for selecting an image capturing apparatus targeted for reproduction of a trace recording (hereinafter referred to as "trace reproduction"). For example, the operation reception unit 403 receives a user operation for selecting at least one of "camera 1" to "camera 4" by a mouse operation on the UI screen 500, as an operation for selecting a target for trace reproduction. Furthermore, in the following description, all of the "camera 1" to "camera 4", in other words, all of the image capturing apparatuses 101 to 104, are assumed to have been selected as targets for trace reproduction.

Next, in step S802, the system control unit 404 acquires a trace recording associated with the currently selected value of the trace No. setting portion 507 with respect to each of image capturing apparatuses targeted for trace reproduction. In a case where the value "1" is currently selected in the trace No. setting portion 507, for example, the system control unit 404 acquires, from the storage unit 402, the trace recordings 701 to 704 as trace recordings of the image capturing apparatuses 101 to 104 associated with the value "1" of the trace No. setting portion 507.

Next, in step S803, the system control unit 404 determines whether the reproduction preparation button 510 has been pressed by the user, and, if it is determined that the reproduction preparation button 510 has been pressed (YES in step S803), the system control unit 404 advances the processing to step S804. On the other hand, if it is determined that the reproduction preparation button 510 has not been pressed (NO in step S803), the system control unit 404 repeats processing in step S803. In step S804, the system control unit 404 issues an instruction for preparation for trace reproduction to an image capturing apparatus targeted for trace reproduction. Specifically, the system control unit 404 transmits, to each of the image capturing apparatuses 101 to 104 via the communication unit 401, a control command for performing control in such a manner that a pan value, a tilt value, a zoom value, and a value related to image quality conditions obtained at the time of start of the corresponding trace recording are set. For example, the system control unit 404 transmits, to the image capturing apparatus 101, a control command serving as a pan value, a tilt value, a zoom value, and a focus value obtained at the time of start of the trace recording 701, in other words, at the time of 0 ms, corresponding to the image capturing apparatus 101. The system control unit 404 also performs similar processing with respect to the image capturing apparatuses 102 to 104.

Next, in step S805, the system control unit 404 determines whether the preparation for trace reproduction has been completed. Specifically, for example, when, after transmitting a control command to each image capturing apparatus in step S804, receiving, from each image capturing apparatus, a response indicating that control that is based on the control command has been completed, the system control unit 404 determines that the preparation for trace reproduction has been completed. If it is determined that the preparation for trace reproduction has been completed (YES in step S805), the system control unit 404 advances the processing to step S806, and, if it is determined that the preparation for trace reproduction has not yet been completed (NO in step S805), the system control unit 404 repeats processing in step S805. In step S806, the system control unit 404 performs displaying that is based on tally information included in a trace recording corresponding to an image capturing apparatus selected as a target for trace reproduction. Furthermore, the details of processing in step S806 are described below with reference to FIGS. 9A, 9B, and 9C.

Next, in step S807, the system control unit 404 determines whether the operation reception unit 403 has received pressing of the reproduction start button 511. If it is determined that the operation reception unit 403 has received pressing of the reproduction start button 511 (YES in step S807), the system control unit 404 advances the processing to step S808. If it is determined that the operation reception unit 403 has not received pressing of the reproduction start button 511 (NO in step S807), the system control unit 404 repeats processing in step S807.

In step S808, the system control unit 404 updates a situation of trace reproduction. Specifically, the system control unit 404 performs the following processing. Thus, the system control unit 404 generates a control command serving as a pan value, a tilt value, a zoom value, and a value related to image quality conditions which are associated with a next elapsed time in the corresponding trace recording with respect to each of image capturing apparatuses selected as targets for trace reproduction, and transmits the generated control command to each of the image capturing apparatuses. Here, suppose a case where, for example, the situation is immediately after the system control unit 404 transmits, to the image capturing apparatus 101, a control command serving as a pan value, a tilt value, a zoom value, and a focus value which are associated with the time of start, i.e., 0 ms, in trace recording with respect to the trace recording 701 corresponding to the image capturing apparatus 101. At this time, the system control unit 404 generates a control command serving as a pan value, a tilt value, a zoom value, and a focus value which are associated with a next elapsed time (100 ms) of the trace recording 701, and transmits the generated control command to the image capturing apparatus 101. The system control unit 404 performs similar processing with respect to the image capturing apparatuses 102 to 104. In this way, according to parameters recorded in a time-series manner in a trace recording, image capturing apparatuses corresponding to the trace recording are successively controlled.

In step S809, the system control unit 404 determines whether trace reproduction has ended. Specifically, the system control unit 404 determines whether the transmission to the image capturing apparatuses of a control command serving as parameters recorded temporarily last time in trace recording (in the examples illustrated in FIGS. 7A to 7D, parameters associated with 180,000 ms) has been completed. Then, in a case where the transmission has been completed, the system control unit 404 determines that trace reproduction has ended, and, in a case where the transmission has not yet been completed, the system control unit 404 determines that trace reproduction has not yet ended. If, in step S809, it is determined that trace reproduction has ended (YES in step S809), the system control unit 404 ends the processing illustrated in FIG. 8, and, if it is determined that trace reproduction has not yet ended (NO in step S809), the system control unit 404 returns the processing to step S808, thus performing processing in step S808 again.

Figure 9A:
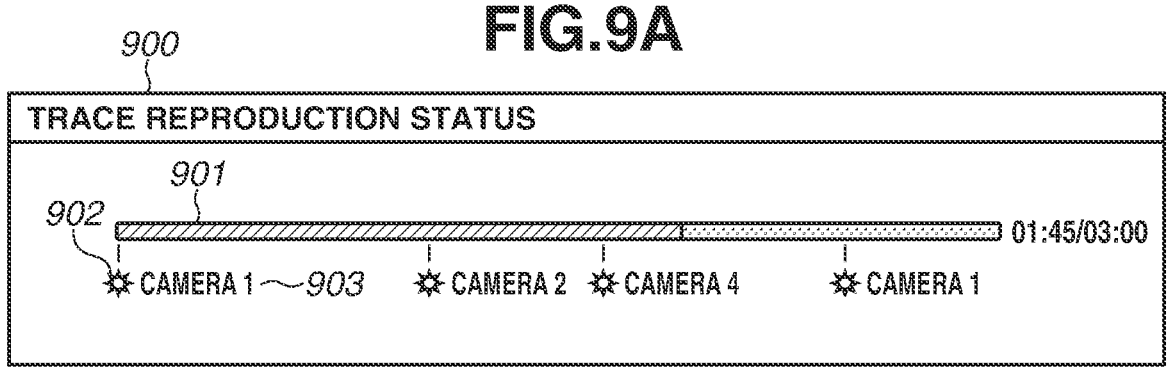
FIGS. 9A, 9B, and 9C are diagrams illustrating UI screens that are based on tally information.
Figure 9B:
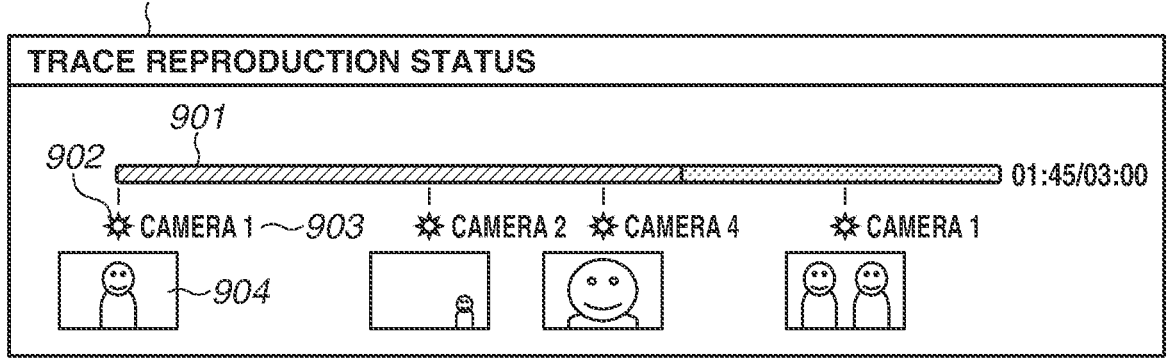
Figure 9C:
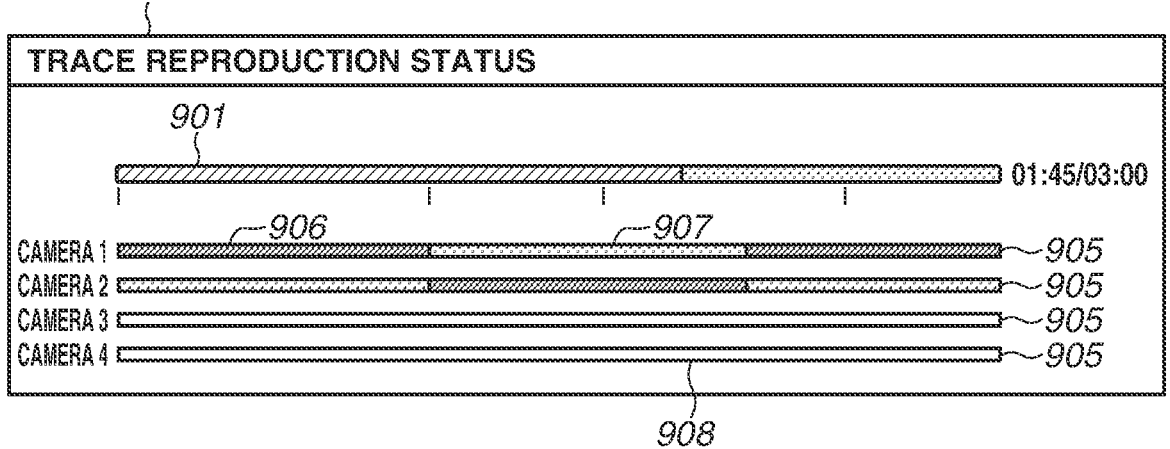

Here, displaying that is based on tally information which is displayed on the monitor 120 by processing in step S806 is described with reference to FIGS. 9A, 9B, and 9C. A UI screen 900 illustrated in FIG. 9A is a UI screen which is displayed by the system control unit 404 in step S806, and is displayed based on tally information in trace recording. A reproduction time bar 901 illustrated in FIG. 9A indicates a predetermined period in which parameters were recorded in a trace recording, and differs in display form between a time period in which a trace recording is currently being reproduced and a time period in which a trace recording is not currently being reproduced. An icon 902 indicates timing at which tally information in trace recording has switched, and discrimination information 903 about an image capturing apparatus to which the tally information has switched is also displayed in juxtaposition. Furthermore, while, in the example illustrated in FIG. 9A, particularly, timing at which the image capturing apparatus has entered into a state of program being in execution (first video delivery state) is indicated as timing at which tally information in trace recording has switched, the first exemplary embodiment is not limited to this. An icon indicating timing at which the image capturing apparatus has entered into a state of program being in execution (first video delivery state) and an icon indicating timing at which the image capturing apparatus has entered into a state of preview being in execution (second video delivery state) can be configured to be displayed in a discriminable manner with respective display forms made different from each other. The operator is able to switch a video delivery state at appropriate timing while checking the icon 902 and the discrimination information 903, which is displayed side by side with the icon 902. Moreover, as illustrated in FIG. 9B, an image captured at timing at which tally information has switched in performing trace recording can be previously recorded as a thumbnail image 904, and the thumbnail image 904 can be configured to be displayed side by side with the icon 902 in the UI screen 900. Moreover, as illustrated in FIG. 9C, the system control unit 404 can be configured to display timelines 905, which indicate changes on a time series of tally information in the UI screen 900 with respect to the respective image capturing apparatuses 101 to 104. At this time, on each of the timelines 905, a bar 906 indicating a time period of the first video delivery state, a bar 907 indicating a time period of the second video delivery state, and a bar 908 indicating a time period of the third video delivery state are displayed with their display forms made different from each other. In addition to the examples illustrated in FIGS. 9A to 9C, in a case where at least two of the image capturing apparatuses 101 to 104 have entered into a state of program being in execution at the same timing, the system control unit 404 can be configured to display a warning message in the UI screen 900. Furthermore, a case where the system control unit 404 displays the UI screen 900 such as those illustrated in FIGS. 9A to 9C on the monitor 120 has been described. At this time, in this case, it is desirable that the switcher 140 and the information processing apparatus 110 be arranged close to each other in such a way as to enable the operator of the switcher 140 to view the monitor 120. Furthermore, the first exemplary embodiment is not limited to this, and the system control unit 404 can be configured to display the UI screen 900 on the monitor 150.

As described above, the information processing apparatus 110 in the first exemplary embodiment receives a user operation for reproducing a trace recording in which at least one of pieces of information about a pan value, a tilt value, and a zoom value of an image capturing apparatus in a predetermined period and tally information in the predetermined period have been recorded. Then, during a period when the trace recording is being reproduced, the information processing apparatus 110 causes at least one of a pan value, a tilt value, and a zoom value of the image capturing apparatus to be controlled according to the trace recording and causes tally information about the image capturing apparatus to be displayed according to the trace recording. In this way, presenting appropriate timing for switching tally information to an operator who performs switching of tally information during reproduction of a trace recording enables reducing a load on the operator.

In a second exemplary embodiment, a method of controlling a video delivery state of an image capturing apparatus according to a trace recording in which at least one of pieces of information about a pan value, a tilt value, and a zoom value of the image capturing apparatus in a predetermined period and tally information about the image capturing apparatus in the predetermined period have been recorded is described. Furthermore, in the second exemplary embodiment, portions different from those in the first exemplary embodiment are mainly described, and constituent elements and processing operations which are the same as or equivalent to those in the first exemplary embodiment are assigned the respective same reference characters and any duplicate description thereof is omitted.

The information processing apparatus 110 in the second exemplary embodiment is able to change a video delivery state of each of the image capturing apparatuses 101 to 104 by transmitting tally information to the image capturing apparatuses 101 to 104 and the switcher 140. For example, the information processing apparatus 110 transmits tally information indicating a state of program being in execution (first video delivery state) to the image capturing apparatus 101 and the switcher 140. At this time, the tally lamp control unit 211 of the image capturing apparatus 101 lights the tally lamp 210 red according to the transmitted tally information. Moreover, at this time, the switcher 140 performs control to bring the image capturing apparatus 101 into a state of program being in execution (first video delivery state) according to the transmitted tally information. Specifically, the switcher 140 lights the number "1" of the program selection buttons 141 and outputs a video image output from the image capturing apparatus 101 to an external apparatus via the video output terminal 144. In this way, the information processing apparatus 110 in the second exemplary embodiment is able to change video delivery states of the image capturing apparatuses 101 to 104 by transmitting tally information to the image capturing apparatuses 101 to 104 and the switcher 140.

Here, the information processing apparatus 110 in the second exemplary embodiment is described with reference to processing in the flow illustrated in FIG. 10. Furthermore, steps S1001 to S1003 are the same as steps S801 to S803 illustrated in FIG. 8 and are, therefore, omitted from description. In step S1004, the system control unit 404 issues an instruction for preparation for trace reproduction to an image capturing apparatus targeted for trace reproduction. In the second exemplary embodiment, the system control unit 404 transmits, to each of the image capturing apparatuses 101 to 104 via the communication unit 401, a control command for performing control in such a manner that a pan value, a tilt value, a zoom value, and a focus value obtained at the time of start of the corresponding trace recording are set. For example, the system control unit 404 transmits, to the image capturing apparatus 101, a control command serving as a pan value, a tilt value, a zoom value, and a focus value obtained at the time of start of the trace recording 701, in other words, at the time of 0 ms. Thus, a control command serving as the pan value "500", the tilt value "100", the zoom value "300", and the focus value "100" is transmitted to the image capturing apparatus 101. At this time, the image capturing apparatus 101 performs control in such a manner that the pan value "500", the tilt value "100", the zoom value "300", and the focus value "100" are set, according to the transmitted control command.

Next, in step S1005, the system control unit 404 determines whether the preparation for trace reproduction has been completed. Furthermore, processing in step S1005 is similar to processing in step S805 and is, therefore, omitted from description. Next, in step S1006, the system control unit 404 determines whether the operation reception unit 403 has received pressing of the reproduction start button 511. If it is determined that the operation reception unit 403 has received pressing of the reproduction start button 511 (YES in step S1006), the system control unit 404 performs the following processing. Thus, the system control unit 404 transmits tally information obtained at the time start of trace recording corresponding to each of image capturing apparatuses targeted for trace reproduction to each of the image capturing apparatuses and the switcher 140, and, after that, advances the processing to step S1006. For example, the system control unit 404 transmits, to the image capturing apparatus 101 and the switcher 140, tally information "red" obtained at the time of 0 ms of the trace recording 701 corresponding to the image capturing apparatus 101. Then, the tally lamp control unit 211 of the image capturing apparatus 101 lights the tally lamp 210 red according to the transmitted tally information, and the switcher 140 outputs a video image output from the image capturing apparatus 101 from the video output terminal 144 to an external apparatus. In this way, in response to the reproduction start button 511 being pressed in a state in which the preparation for trace reproduction has been completed, in other words, in a state in which each image capturing apparatus is set to PTZ and focus values obtained at the time of start of trace recording, each image capturing apparatus enters into a video delivery state indicated by tally information obtained at the time of start of trace recording. If, in step S1006, it is determined that the operation reception unit 403 has not received pressing of the reproduction start button 511 (NO in step S1006), the system control unit 404 repeats processing in step S1006.

In step S1007, the system control unit 404 in the second exemplary embodiment updates a situation of trace reproduction by performing the following processing. Specifically, as with step S808, the system control unit 404 generates a control command serving as a pan value, a tilt value, a zoom value, and a focus value which are associated with a next elapsed time in the corresponding trace recording with respect to each of image capturing apparatuses selected as targets for trace reproduction, and transmits the generated control command to each of the image capturing apparatuses. Moreover, the system control unit 404 in the second exemplary embodiment further transmits tally information associated with a next elapsed time in the corresponding trace recording with respect to each of image capturing apparatuses selected as target for trace reproduction, to each of the image capturing apparatuses and the switcher 140. Here, suppose a case where the situation is immediately after a control command serving as a pan value, a tilt value, a zoom value, and a focus value which are associated with 0 ms in the trace recording 701 is transmitted to the image capturing apparatus 101 and tally information associated with 0 ms is transmitted to the image capturing apparatus 101 and the switcher 140. Thus, suppose a case where the situation is immediately after a control command serving as the pan value "500", the tilt value "100", the zoom value "300", and the focus value "100" is transmitted to the image capturing apparatus 101 and the tally information "red" is transmitted to the image capturing apparatus 101 and the switcher 140. Then, in step S1007, the system control unit 404 performs the following processing. Thus, the system control unit 404 transmits, to the image capturing apparatus 101, a control command serving as a pan value, a tilt value, a zoom value, and a focus value which are associated with a next elapsed time (100 ms) of the trace recording 701 and the tally information "red" associated with the next elapsed time (100 ms). Moreover, at this time, the system control unit 404 also transmits the tally information "red" associated with the next elapsed time (100 ms) to the switcher 140. The system control unit 404 performs similar processing with respect to the image capturing apparatuses 102 to 104. In this way, according to parameters recorded in a time-series manner in trace recording, PTZ, focus, and a video delivery state of image capturing apparatuses corresponding to the trace recording are successively controlled.

In step S1008, the system control unit 404 determines whether trace reproduction has ended. Processing in step S1008 is similar to processing in step S809 and is, therefore, omitted from description.

Furthermore, while, in the above description, the information processing apparatus 110 and the switcher 140 are separate bodies, the information processing apparatus 110 can be configured to include the function of the switcher 140. In the following, a case where the information processing apparatus 110 includes the function of the switcher 140 is described. In this case, video images output from the image capturing apparatuses 101 to 104 are transmitted to the information processing apparatus 110, and, for example, the information processing apparatus 110 transmits a video image output from an image capturing apparatus which is in a state of program being in execution (first video delivery state) out of the image capturing apparatuses 101 to 104 to an external apparatus. The system control unit 404 of the information processing apparatus 110 in this case successively controls video delivery states of the image capturing apparatuses 101 to 104 according to pieces of tally information about trace recordings corresponding to the respective image capturing apparatuses 101 to 104. Moreover, in this case, if, in step S1006, it is determined that the operation reception unit 403 has received pressing of the reproduction start button 511 (YES in step S1006), the system control unit 404 performs the following processing. Specifically, the system control unit 404 transmits tally information obtained at the time of start of trace recording corresponding to each of image capturing apparatuses targeted for trace reproduction to each of the image capturing apparatuses, and changes video delivery states of the respective image capturing apparatuses. For example, the system control unit 404 refers to the trace recording 701 corresponding to the image capturing apparatus 101 and transmits the tally information "red" obtained at the time of 0 ms to the image capturing apparatus 101, and also delivers a video image output from the image capturing apparatus 101 to an external apparatus. Moreover, in step S1007, the system control unit 404 updates a situation of trace reproduction by performing the following processing. Thus, the system control unit 404 generates a control command serving as a pan value, a tilt value, a zoom value, and a focus value which are associated with a next elapsed time in the corresponding trace recording with respect to each of image capturing apparatuses selected as targets for trace reproduction, and transmits the generated control command to each of the image capturing apparatuses. Moreover, the system control unit 404 further transmits tally information associated with a next elapsed time in the corresponding trace recording with respect to each of image capturing apparatuses selected as target for trace reproduction, to each of the image capturing apparatuses. Moreover, at this time, the system control unit 404 controls video delivery states of the respective image capturing apparatuses according to the tally information associated with the next elapsed time. Here, suppose a case where the next elapsed time is 100 ms. At this time, in step S1007, for example, the system control unit 404 transmits the tally information "red" associated with the next elapsed time (100 ms) of the trace recording 701 to the image capturing apparatus 101, and also delivers a video image output from the image capturing apparatus 101, which is in a state of program being in execution, to an external apparatus. In this way, the information processing apparatus 110 itself can be configured to include the function of the switcher 140 and control video delivery states of the respective image capturing apparatuses according to tally information in trace recording.

As described above, the information processing apparatus 110 in the second exemplary embodiment performs the following processing. Thus, the information processing apparatus 110 controls a video delivery state of an image capturing apparatus according to a trace recording in which information about at least one of a pan value, a tilt value, a zoom value, and a value related to image quality conditions of the image capturing apparatus in a predetermined period and tally information about the image capturing apparatus in the predetermined period have been recorded. In this way, controlling a video delivery state of each image capturing apparatus according to tally information recorded in a trace recording at the time of reproduction of a trace recording enables reducing a load on the operator at the time of trace reproduction.

Next, a hardware configuration of the information processing apparatus 110 for implementing the functions in the above-described exemplary embodiments is described with reference to FIG. 11. Furthermore, while, in the following description, a hardware configuration of the information processing apparatus 110 is described, each of the image capturing apparatuses 101 to 104 and the switcher 140 is assumed to be implemented by a similar hardware configuration.

The information processing apparatus 110 in the above-described exemplary embodiments includes a central processing unit (CPU) 1100, a random access memory (RAM) 1110, a read-only memory (ROM) 1120, a hard disk drive (HDD) 1130, and an interface (I/F) 1140.

The CPU 1100 is a central arithmetic device which comprehensively controls the information processing apparatus 110. The RAM 1110 temporarily stores a computer program which the CPU 1100 executes. Moreover, the RAM 1110 provides a work area which the CPU 1100 uses to perform processing. Moreover, for example, the RAM 1110 functions as a frame memory or functions as a buffer memory.

The ROM 1120 stores, for example, programs which the CPU 1100 executes to control the information processing apparatus 110. The HDD 1130 is a storage device which records, for example, image data.

The I/F 1140 performs communication with an external apparatus via the network 160 in conformity with the Transmission Control Protocol/Internet Protocol (TCP/IP) or the HyperText Transfer Protocol (HTTP).

Furthermore, while, in the above-described exemplary embodiments, an example in which the CPU 1100 performs processing has been described, at least a part of the processing which the CPU 1100 performs can be configured to be performed by dedicated hardware. For example, processing for displaying a graphical user interface (GUI) or image data on the monitor 120 or 150 can be performed by a graphics processing unit (GPU). Moreover, processing for reading out program code from the ROM 1120 and loading the program code onto the RAM 1110 can be performed by direct memory access (DMA), which functions as a transfer device.

Furthermore, the present disclosure can also be implemented by processing in which one or more processors read out and execute a program which implements one or more functions of the above-described exemplary embodiments. The program can be configured to be supplied to a system or apparatus including the processor via a network or a storage medium.

Moreover, the present disclosure can be implemented by a circuit which implements one or more functions of the above-described exemplary embodiments (for example, an application specific integrated circuit (ASIC)). Moreover, each unit of the information processing apparatus 110 can be implemented by hardware illustrated in FIG. 11, or can be implemented by software. Furthermore, one or more functions of the information processing apparatus 110 in the above-described exemplary embodiments can be included in another apparatus.

While the present disclosure has been described above with regard to exemplary embodiments thereof, the above-described exemplary embodiments represent merely examples of embodiments for implementing the present disclosure, and the technical scope of the present disclosure should not be construed to be limited by those embodiments. Thus, the present disclosure can be implemented in various manners within a range not departing from the technical ideas or principal features of the present disclosure. For example, a combination of the above-described exemplary embodiments is also included in the disclosure content of the present specification.

According to the above-described exemplary embodiments, it is possible to reduce a load from being put on the operator at the time of reproduction of a trace recording.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-136104 filed Aug. 24, 2021, which is hereby incorporated by reference herein in its entirety.

What is claimed is:

1. An information processing apparatus comprising a computer executing instructions that, when executed by the computer, cause the computer to function as:
   at least one memory storing instructions; and
   at least one processor that is configured, upon execution of the stored instructions, to act as:
   a recording unit configured to record, as a trace recording, trace information about at least one of a pan value, a tilt value, a zoom value, and a value related to image quality conditions during a predetermined period for a first image capturing unit configured to capture an image, and to associate the trace recording with tally information indicating a state of video delivery of the first image capturing unit during the predetermined period;
   a reception unit configured to receive a user operation for issuing an instruction for reproducing the trace recording recorded by the recording unit; and
   a control unit configured to perform predetermined processing during a period in a case where the trace recording is being reproduced according to the user operation received by the reception unit,
   wherein, as the predetermined processing, according to the tally information recorded in the trace recording, the control unit (a) causes a display unit to display information indicating the state of video delivery of the first image capturing unit or (b) controls the state of video delivery of the first image capturing unit.

2. The information processing apparatus according to claim 1, wherein, during a period when the trace recording is being reproduced, the control unit controls at least one of a pan value, a tilt value, a zoom value, and a value related to image quality conditions of the first image capturing unit according to the trace recording.

3. The information processing apparatus according to claim 1, wherein, according to the tally information recorded in the trace recording, the control unit causes the display unit to display information indicating timing at which the first image capturing unit enters into a first video delivery state, in which the first image capturing unit is in execution of delivering a video image to an external apparatus, as information indicating the state of video delivery of the first image capturing unit.

4. The information processing apparatus according to claim 3, wherein, according to the tally information recorded in the trace recording, the control unit further causes the display unit to display information indicating timing at which the first image capturing unit enters into a second video delivery state, which is a candidate for next becoming the first video delivery state, as information indicating the state of video delivery of the first image capturing unit.

5. The information processing apparatus according to claim 1, wherein, according to the tally information recorded in the trace recording, the control unit causes the display unit to display a timeline in which a time period in which the first image capturing unit enters into a first video delivery state, in which the first image capturing unit is in execution of delivering a video image to an external apparatus, is discriminable, as information indicating the state of video delivery of the first image capturing unit.

6. The information processing apparatus according to claim 1, wherein, based on the tally information recorded in the trace recording, the control unit performs control in such a manner that the first image capturing unit enters into a first video delivery state, in which the first image capturing unit is in execution of delivering a video image to an external apparatus.

7. The information processing apparatus according to claim 1, wherein the trace recording includes information about at least one of a series of a pan value, a tilt value, a zoom value, and a value related to image quality conditions in the predetermined period and information about a period in which the first image capturing unit enters into a first video delivery state, in which the first image capturing unit is in execution of delivering a video image to an external apparatus, in the predetermined period.

8. The information processing apparatus according to claim 7, wherein the trace recording further includes information about a period in which the first image capturing unit enters into a second video delivery state, which next becomes the first video delivery state, in the predetermined period.

9. The information processing apparatus according to claim 1, wherein the value related to image quality conditions is at least one of a focus value, a value for adjusting exposure compensation, an aperture value, and a shutter speed value.

10. An information processing method comprising:
recording, as a trace recording, trace information about at least one of a pan value, a tilt value, a zoom value, and a value related to image quality conditions during a predetermined period for a first image capturing unit configured to capture an image, and to associate the trace recording with tally information indicating a state of video delivery of the first image capturing unit during the predetermined period;
receiving a user operation for issuing an instruction for reproducing the trace recording; and
performing predetermined processing during a period in a case where the trace recording is being reproduced according to the received user operation,
wherein the predetermined processing includes, according to the tally information recorded in the trace recording, (a) causing a display unit to display information indicating the state of video delivery of the first image capturing unit or (b) controlling the state of video delivery of the first image capturing unit.

11. A non-transitory computer-readable storage medium storing computer-executable instructions that, when executed by a computer, cause the computer to perform a method comprising:
recording, as a trace recording, trace information about at least one of a pan value, a tilt value, a zoom value, and a value related to image quality conditions during a predetermined period for a first image capturing unit configured to capture an image, and to associate the trace recording with tally information indicating a state of video delivery of the first image capturing unit during the predetermined period;
receiving a user operation for issuing an instruction for reproducing the trace recording; and
performing predetermined processing during a period in a case where the trace recording is being reproduced according to the received user operation,
wherein the predetermined processing includes, according to the tally information recorded in the trace recording, (a) causing a display unit to display information indicating the state of video delivery of the first image capturing unit or (b) controlling the state of video delivery of the first image capturing unit.

* * * * *